United States Patent [19]
Vollum

[11] 3,725,724
[45] Apr. 3, 1973

[54] DEFLECTION FACTOR INDICATING APPARATUS

[75] Inventor: Charles Howard Vollum, Portland, Oreg.

[73] Assignee: Tektronix, Inc., Beaverton, Oreg.

[22] Filed: Jan. 11, 1971

[21] Appl. No.: 105,336

[52] U.S. Cl. ............315/24, 200/167 A, 178/7.5 SE
[51] Int. Cl. .............................................H01j 29/70
[58] Field of Search ..315/24; 200/167 A; 178/7.5 SE

[56] References Cited

UNITED STATES PATENTS

| 2,665,343 | 1/1954 | Benson | 200/167 A |
| 2,711,711 | 6/1955 | Harman | 200/167 A |
| 3,471,743 | 10/1969 | Olsson et al. | 315/24 |
| 2,980,821 | 4/1961 | Dunn et al. | 315/24 |

Primary Examiner—Carl D. Quarforth
Assistant Examiner—J. M. Potenza
Attorney—Buckhorn, Blore, Klarquist & Sparkman

[57] ABSTRACT

A switch apparatus is described including a rotary switch operated by a knob having a movable dial flange with display characters thereon at switch positions corresponding to different multiplying factors provided for the output signal of an electrical circuit controlled by such switch. A pair of fixed light sources mounted at two different readout positions beneath the flange are selectively energized by an external multiplier switch to illuminate only one of the factors at such readout positions in accordance with the operation of such multiplier switch. The rotary switch and multiplier switch may be connected to change the gain of a vertical amplifier or to change the sweep speed of a horizontal ramp generator in a cathode ray oscilloscope so that the illuminated character display on the knob dial automatically indicates the proper deflection factors of such oscilloscope.

14 Claims, 3 Drawing Figures

PATENTED APR 3 1973 3,725,724
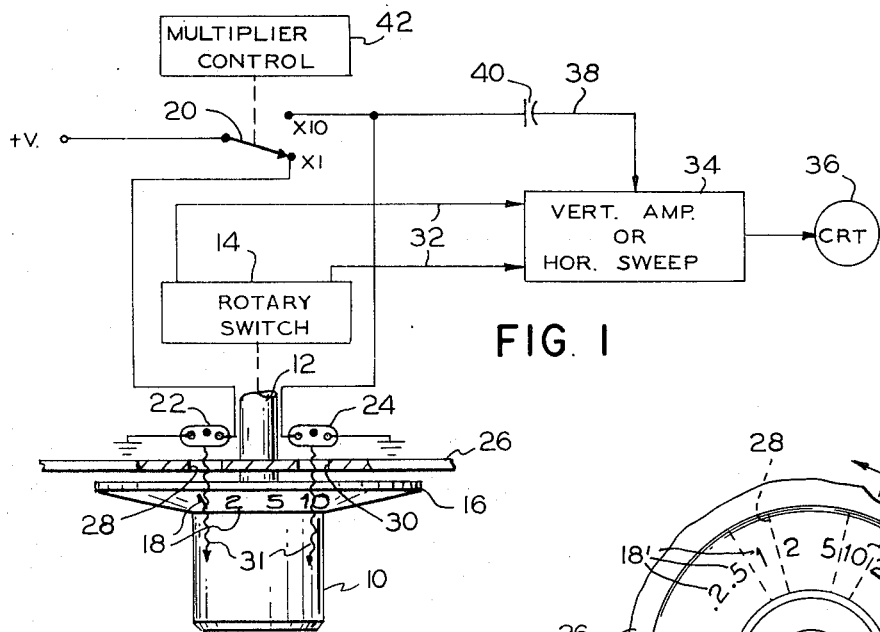
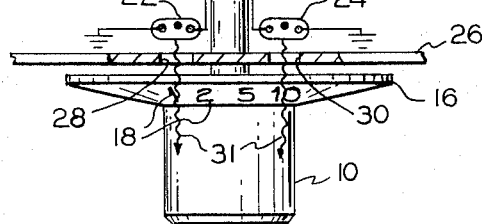
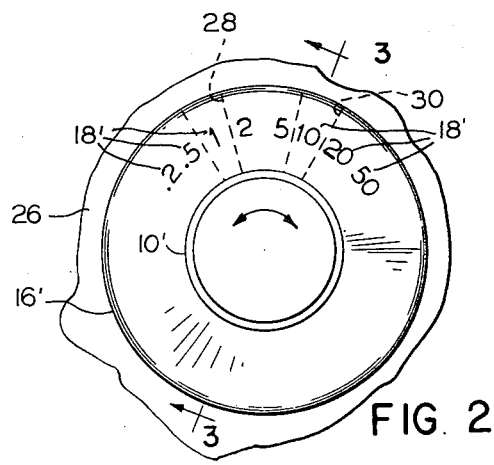
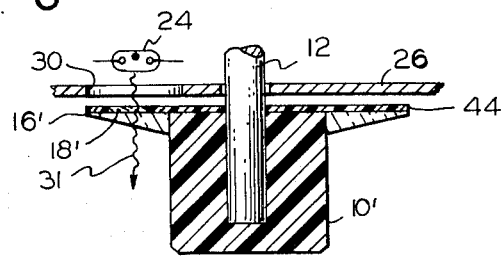
FIG. 1
FIG. 2
FIG. 3
CHARLES HOWARD VOLLUM
INVENTOR
BY
BUCKHORN, BLORE, KLARQUIST & SPARKMAN
ATTORNEYS

3,725,724

DEFLECTION FACTOR INDICATING APPARATUS

BACKGROUND OF THE INVENTION

The subject matter of the present invention relates generally to switch apparatus and associated indicating means, and in particular, to such a switch apparatus including a movable dial with two selectively illuminated readout positions. A deflection factor indicating apparatus is disclosed including a rotary switch with a knob having a dial flange with display characters thereon at its switch positions for indicating different signal multiplying factors provided by such rotary switch alone or in combination with a multiplier switch by selectively energizing a pair of light sources at two different readout positions in response to operation of the multiplier switch to illuminate only one factor display at the proper readout position corresponding to the condition of such multiplier switch.

The present invention is especially useful on cathode ray oscilloscopes for indicating the deflection factor of such oscilloscopes by employing it in connection with the rotary switch controlling either the amplitude gain of the vertical amplifier or the sweep time of the horizontal ramp sweep generator when such deflection factors are changed by an external factor multiplier switch or other means external to the rotary switch. Thus, the gain of the output signal of the vertical amplifier can be reduced a predetermined amount by connecting an attenuator probe to the input of such amplifier as one example of an external multiplying means. Another example would be a sweep "magnifier" switch connected to the horizontal sweep generator for increasing the sweep time of its output signal by reducing the slope of its ramp shaped waveform by a known factor.

Previously, it was necessary for the operator of the oscilloscope to perform mental calculations including multiplying the external multiplier factor times the reading of the rotary knob on the front panel of the oscilloscope to determine the proper deflection factor of the signal displayed on such oscilloscope. As a result, many operator errors occurred in reading the vertical amplitude and horizontal time values of the signal displayed due to failure to multiply the knob readings by the proper external multiplying factor. This problem is avoided in the present invention because the proper deflection factor is automatically illuminated on the rotary knob at all times.

Conventional switches employ a movable pointer on the switch knob and the switch position indicating numbers are fixed on the front panel of the oscilloscope or other instrument. The present invention reverses this and, instead, uses movable indicating numbers on the knob and provides a fixed pointer in the form of a light source positioned behind a masking aperture in the front panel of the oscilloscope. This reduces the mounting space required on the front panel of the oscilloscope. In addition, by providing an illuminated readout rather than merely using a pointer, the switch factor indicating apparatus of the present invention can be read more easily and is visible in a darkened room. These are two additional advantages over the prior art.

It is, therefore, one object of the present invention to provide an improved switch apparatus having a deflection factor indicating means of simple and economical construction which automatically indicates the proper factor when an external multiplier means has been operated in addition to the main switch with which the indicator means is associated.

Another object of the invention is to provide such a switch apparatus in which the indicator numbers are provided on a movable dial member rotated by the knob of such main switch past a pair of fixed light sources at two readout positions which are selectively energized in accordance with the operation of the external multiplier means to provide an illuminated character display of the proper factor.

A further object of the invention is to provide such switch apparatus in which the main switch and external multiplier means are connected to the vertical amplifier or the horizontal sweep generator of a cathode ray oscilloscope to change the amplitude gain of the vertical output signal or to change the sweep time of the horizontal sweep signal and to automatically indicate the proper deflection factor of the signal displayed on such oscilloscope.

Still another object of the invention is to provide a switch apparatus having a movable dial on the switch knob and a fixed pointer light source beneath such dial which occupies less mounting space and is visible under dim ambient lighting conditions.

BRIEF DESCRIPTION OF DRAWINGS

Other objects and advantages of the present invention will be apparent from the following detailed description of a preferred embodiment thereof and from the attached drawings of which:

FIG. 1 is a plan view with parts broken away for purposes of clarity of one embodiment of the deflection factor indicating apparatus of the present invention together with a schematic diagram of electrical circuitry associated therewith;

FIG. 2 is a front elevation view of the knob employed in another embodiment of the deflection factor indicating apparatus of FIG. 1;

FIG. 3 is a vertical section view taken along the line 3—3 in FIG. 2.

DESCRIPTION OF PREFERRED EMBODIMENT

As shown in FIG. 1, one embodiment of the deflection factor indicating apparatus of the present invention includes a knob 10 mounted on a rotatable shaft 12 which is coupled to a rotary switch 14 connected to an electrical circuit for changing the amplitude or time characteristics of its output signal as hereafter described. The knob has an outer flange or skirt 16 extending radially outward and forming a movable dial on which are provided a plurality of indicator characters 18. The indicator characters may be in the form of numbers corresponding to multiplying factors which are set by the different switch positions of the rotary switch 14 and of an external multiplier switch 20 separated from and external to such rotary switch.

The external multiplier switch 20 may have two positions, including a times one position (X1) and a times ten position (X10) in which the stationary contacts of such switch positions are connected respectively to a pair of fixed light sources 22 and 24 which act as pointers for the dial 16. The movable contact of the external multiplier switch 20 is connected to a source of positive DC voltage to selectively energize light source 22 or light source 24 depending on the position of such switch. A light opaque mask member 26 which may be the front panel of a cathode ray oscilloscope is provided with a pair of masking apertures 28 and 30 in alignment with light sources 22 and 24, respectively, to form two different readout positions for the dial 16. Thus, the light sources selectively illuminate the indicator numbers 18 to provide a character display of only one of the factors at such readout positions without displaying the other factors on the dial 16.

In the embodiment shown in FIG. 1, the display characters 18 forming the factors are provided as light transparent openings extending through a light opaque plastic flange 16. Light rays 31 emitted by light sources 22 or 24 are transmitted through the selected characters 18 in the readout positions to illuminate the characters. In the shown positions of the knob 10 and the external multiplier switch 20, the factor "1" will be illuminated on the dial 16 by light source 22 since only such light source is energized corresponding to a condition when there is no external factor multiplier. However, in the other condition, when multiplier switch 20 is moved to the "X10" position, light source 24 is energized and the other light source 22 is de-energized so that the factor "10" is illuminated on the dial. Thus, the correct multiplying factor is automatically indicated by illuminating the proper factor 18 on the dial 16.

The light sources 22 and 24 each may be of the gas lamp type, including a sealed glass envelope containing a light emitting gas, such as neon, and two spaced electrodes, one of which is grounded and the other is connected to the switch 20 to provide a long lifetime light source. However, it may be desirable to employ an incandescent filament type lightbulb to provide a brighter light source of shorter lifetime.

The rotary switch 14 has a pair of output conductors 32 which are connected to an electrical circuit 34, such as the vertical amplifier or horizontal sweep generator of a cathode ray oscilloscope including a cathode ray tube 36 whose deflection plates are connected to the outputs of such vertical amplifier and such sweep generator. In the case of a vertical amplifier, the rotary switch 14 changes the gain of such amplifier to adjust the voltage amplitude of the vertical output signal of such amplifier circuit by predetermined amounts or factors indicated by illuminated character display 18 on the dial 18. In the case of a horizontal sweep generator, the rotary switch 14 changes the sweep speed to adjust the slope of the leading edge of the ramp shaped voltage forming the horizontal sweep signal produced at the output of such sweep generator by predetermined amounts or factors indicated by an illuminated character display 18 on the dial 16.

The external multiplier switch 20 is shown connected through a conductor 38 between the "X10" contact of such switch and a control terminal of the electrical circuit 34. This changes the gain of the vertical amplifier or the sweep speed of the horizontal sweep generator by a factor of 10. It should be noted that a coupling capacitor 40 may be provided in lead 38 to prevent the DC supply voltage of the electrical circuit 34 from being transmitted to the light source 24 to energize such light source. Of course, it may be desirable instead to provide the "X10" control signal to the circuit 34 from another switch which is ganged to the external multiplier switch 20, but this has not been shown for purposes of simplicity.

The external multiplier switch 20 is operated by a multiplier control means 42 which may be a push button or sliding knob provided on an electrical probe connected to the input of the vertical amplifier or as the "sweep magnifier" switch on the front panel of a sweep generator plug-in unit. Alternatively, the multiplier control means 42 may be provided on a coaxial cable connector attached to the input of the vertical amplifier and adapted to be engaged by another connector on the output end of the probe cable for automatically switching the multiplier switch 20 to the "X10" position when such cable is connected. Also, it should be noted that an electronic switch can be employed in place of the mechanical switch shown for the external multiplier switch 20.

As shown in FIGS. 2 and 3, the rotary switch knob of FIG. 1 can be modified to provide a knob 10' having a light transparent outer flange 16' which is provided with factor display characters 18' formed as transparent image portions of a film negative layer 44 coated on the back side of the knob. Thus, the display characters 18' are provided as light transparent portions of the layer 44 and the remaining portions of such layers are light opaque. In this embodiment, like that of FIG. 1, the light rays 31 emitted from the light sources 22 and 24 still pass through openings 28 and 30 in the mask 26 to illuminate only one of the factor character displays 18' at each of the two readout positions in alignment with such apertures.

It will be obvious to those having ordinary skill in the art that many changes may be made in the details of the above-described preferred embodiment of the present invention without departing from the spirit of the invention. For example, the factor indicating means provided on the flange 16 may be a separate member coupled to the knob 10 for rotation therewith or light opaque characters can be employed on a light transparent dial flange 16. Therefore, the scope of the present invention should only be determined by the following claims.

I claim:

1. Deflection factor indicating apparatus comprising:
   switch means including a knob for changing the connections in an electrical circuit to provide different multiplying factors which vary the amplitude or time characteristics of the output signal of said circuit, by movement of the knob between different switch positions corresponding to said factors;
   indicator means moved by said knob and having display characters thereon for indicating said factors at said switch positions of said knob;
   illumination means including two light sources located at two different readout positions adjacent said indicator means for illuminating only the display characters of one factor at each of said readout positions; and
   control means for selectively energizing said two light sources in accordance with the operation of an external factor multiplier means separate from said switch means, for changing the selected factor from that set by said switch means independent of movement of said knob.

2. Apparatus in accordance with claim 1 in which the switch means is a rotary switch and the indicator means is a dial flange extending radially outward from said knob which rotates with said knob.

3. Apparatus in accordance with claim 2 in which the display characters are provided in light transparent areas on said flange.

4. Apparatus in accordance with claim 1 in which the display characters are light transparent and said light sources project light through the selected characters in said readout positions.

5. Apparatus in accordance with claim 4 in which the illumination means includes a light opaque mask member mounted between said characters and said light sources, said mask member having a pair of apertures therethrough in alignment with only the characters at said two readout positions.

6. Apparatus in accordance with claim 1 in which the electrical circuit is the vertical amplifier of a cathode ray oscilloscope and the factor is the vertical deflector amplitude factor.

7. Apparatus in accordance with claim 6 in which the external multiplier means is an electrical probe means connected to the input of the vertical amplifier for changing the gain of the output signal of said amplifier.

8. Apparatus in accordance with claim 1 in which the electrical circuit in the horizontal ramp generator of a cathode ray oscilloscope and the factor is the horizontal deflection time factor.

9. Apparatus in accordance with claim 8 in which the external multiplier means is a sweep magnifier switch means connected to the ramp generator for changing the slope of the leading edge of the ramp output signal of said generator.

10. Apparatus in accordance with claim 1 in which the light sources are a pair of light bulbs each connected to an external multiplier switch means for selectively energizing said light bulbs one at a time in different positions of said external switch means.

11. switch apparatus comprising:
   switch means including knob means for changing the setting of said switch means by movement of said knob means between a plurality of different switch positions;
   indicator means moved by said knob means and having display characters thereon for indicating the settings of said switch means at said switch positions of said knob means; and
   illumination means including spaced light source means mounted adjacent said indicator means with one of said light source means illuminating one of said display characters at a selected switch position while the other of said light source means is non-illuminated and the other of said light source means illuminating another of said display characters at the selected switch position by control means separate from said switch means while the said one of said light source means is non-illuminated independent of movement of said knob means.

12. Apparatus in accordance with claim 11 in which the switch means is a rotary switch and the indicator means is a dial flange extending radially outward from said knob means which rotates the knob.

13. Apparatus in accordance with claim 12 in which the display characters are light transparent and the light source means projects light through the selected characters.

14. Apparatus in accordance with claim 12 in which the illumination means includes a light opaque mask member mounted between said light source means and said flange with an aperture therethrough in alignment with said light source means and said selected characters.

* * * * *